United States Patent
Bucaro

(10) Patent No.: US 9,940,235 B2
(45) Date of Patent: Apr. 10, 2018

(54) METHOD AND SYSTEM FOR VALID MEMORY MODULE CONFIGURATION AND VERIFICATION

(71) Applicant: Oracle International Corporation, Redwood City, CA (US)

(72) Inventor: Edward Alfonso Bucaro, Sunnyvale, CA (US)

(73) Assignee: ORACLE INTERNATIONAL CORPORATION, Redwood City, CA (US)

(*) Notice: Subject to any disclaimer, the term of this patent is extended or adjusted under 35 U.S.C. 154(b) by 144 days.

(21) Appl. No.: 15/197,471

(22) Filed: Jun. 29, 2016

(65) Prior Publication Data
US 2018/0004658 A1 Jan. 4, 2018

(51) Int. Cl.
G06F 17/00 (2006.01)
G06F 12/06 (2006.01)
G06F 13/40 (2006.01)

(52) U.S. Cl.
CPC ...... G06F 12/0684 (2013.01); G06F 13/4068 (2013.01); *G06F 2212/2532* (2013.01)

(58) Field of Classification Search
None
See application file for complete search history.

(56) References Cited

U.S. PATENT DOCUMENTS

| | | |
|---|---|---|
| 4,554,661 A | 11/1985 | Bannister |
| 4,649,515 A | 3/1987 | Thompson et al. |
| 4,727,545 A | 2/1988 | Glackemeyer et al. |
| 5,056,092 A | 10/1991 | Bruner |
| 5,070,301 A | 12/1991 | Schweitzer, Jr. |
| 5,090,014 A | 2/1992 | Polich et al. |
| 5,109,486 A | 4/1992 | Seymour |
| 5,214,653 A | 5/1993 | Elliott, Jr. et al. |
| 5,293,556 A | 3/1994 | Hill et al. |
| 5,394,543 A | 2/1995 | Hill et al. |
| 5,436,909 A | 7/1995 | Dev et al. |

(Continued)

FOREIGN PATENT DOCUMENTS

| | | |
|---|---|---|
| JP | 61122759 A | 6/1986 |
| JP | 11194961 A | 7/1999 |
| JP | 5181707 B2 | 4/2013 |

OTHER PUBLICATIONS

United Kingdom Application No. 0107370.9, Search Report dated Dec. 11, 2001, 1 page.

(Continued)

*Primary Examiner* — Cheng-Yuan Tseng
(74) *Attorney, Agent, or Firm* — Kilpatrick Townsend & Stockton LLP

(57) ABSTRACT

Aspects of the present disclosure involve a system and method for verifying and validating accurate memory module placement on a printed circuit board. In one embodiment, the printed circuit board is configured to include actuating elements that can be used to verify correct memory module location placement on the printed circuit board. In another embodiment, the actuating elements can be used to validate accurate memory module placement. The actuating elements can be in the form of buttons that may be depressed and configured to trigger light emitting diodes (LEDs) that correspond to the slots on the printed circuit board.

20 Claims, 7 Drawing Sheets

(56) References Cited

U.S. PATENT DOCUMENTS

| | | | |
|---|---|---|---|
| 5,561,760 | A | 10/1996 | Ferris et al. |
| 5,587,930 | A | 12/1996 | Hori et al. |
| 5,655,068 | A | 8/1997 | Opoczynski et al. |
| 5,673,028 | A | 9/1997 | Levy et al. |
| 5,712,967 | A | 1/1998 | Grossman et al. |
| 5,815,652 | A | 9/1998 | Ote et al. |
| 5,838,899 | A | 11/1998 | Leavitt et al. |
| 6,000,040 | A | 12/1999 | Culley et al. |
| 6,038,680 | A | 3/2000 | Olarig |
| 6,114,866 | A | 9/2000 | Matsuo et al. |
| 6,185,718 | B1 | 2/2001 | Dell et al. |
| 6,349,335 | B1 | 2/2002 | Jenney |
| 6,385,665 | B1 | 5/2002 | Canady et al. |
| 6,452,809 | B1 | 9/2002 | Jackson et al. |
| 6,460,151 | B1 | 10/2002 | Warwick et al. |
| 6,523,140 | B1 | 2/2003 | Arndt et al. |
| 6,532,552 | B1 | 3/2003 | Benignus et al. |
| 6,556,438 | B1 | 4/2003 | Bolognia et al. |
| 6,557,121 | B1 | 4/2003 | McLaughlin et al. |
| 6,583,989 | B1 | 6/2003 | Guyer et al. |
| 6,594,774 | B1 | 7/2003 | Chapman et al. |
| 6,640,151 | B1 | 10/2003 | Somekh |
| 6,644,556 | B2 | 11/2003 | Adelmann |
| 6,651,138 | B2 | 11/2003 | Lai et al. |
| 6,678,839 | B2 | 1/2004 | Mori |
| 6,697,962 | B1 | 2/2004 | McCrory et al. |
| 6,747,563 | B2 | 6/2004 | Post et al. |
| 6,785,785 | B2 | 8/2004 | Piccirillo et al. |
| 7,096,387 | B2 | 8/2006 | Durrant et al. |
| 7,137,039 | B2 | 11/2006 | Durrant et al. |
| 7,321,312 | B1 | 1/2008 | Garnett |
| 8,006,028 | B2 * | 8/2011 | Dang .................. G06F 11/006 711/172 |
| 2001/0003835 | A1 | 6/2001 | Watts |
| 2002/0124114 | A1 | 9/2002 | Bottom et al. |
| 2002/0138782 | A1 | 9/2002 | Durrant et al. |
| 2002/0138791 | A1 | 9/2002 | Durrant et al. |
| 2003/0028823 | A1 | 2/2003 | Kallela et al. |
| 2003/0030990 | A1 | 2/2003 | King et al. |
| 2003/0033364 | A1 | 2/2003 | Garnett et al. |
| 2003/0033366 | A1 | 2/2003 | Garnett et al. |
| 2003/0033399 | A1 | 2/2003 | Garnett et al. |
| 2003/0033409 | A1 | 2/2003 | King et al. |
| 2003/0033460 | A1 | 2/2003 | King et al. |
| 2003/0033544 | A1 | 2/2003 | King et al. |
| 2003/0048615 | A1 | 3/2003 | King et al. |
| 2003/0051167 | A1 | 3/2003 | King et al. |
| 2004/0078711 | A1 | 4/2004 | King et al. |
| 2004/0103181 | A1 | 5/2004 | Chambliss et al. |
| 2005/0049825 | A1 | 3/2005 | King et al. |
| 2005/0160311 | A1 | 7/2005 | Hartwell et al. |
| 2016/0116961 | A1 * | 4/2016 | Kunnathur Ragupathi ................ G06F 1/32 713/320 |
| 2018/0004658 | A1 * | 1/2018 | Bucaro ............. G06F 12/0684 |

OTHER PUBLICATIONS

United Kingdom Application No. 0107372.5, Search Report dated Dec. 17, 2001, 1 page.

\* cited by examiner

METHOD AND SYSTEM FOR VALID MEMORY MODULE CONFIGURATION AND VERIFICATION

TECHNICAL FIELD

This disclosure relates generally to computing systems with variable memory module configurations.

BACKGROUND

Computing systems are often customizable to meet various customer needs. An aspect of the computing system that can be reconfigured is memory. For example, computing systems may accommodate varying memory module configurations. Generally, each memory module configuration requires a specified number of modules correctly installed in specific slots on the printed circuit board (PCB). Oftentimes, the system can include a user manual or printed layout to provide a guidance to ensure memory modules are correctly placed on the PCB based on the memory module configuration desired. However, an incorrectly placed or missing memory module is undetectable until the computing system is up and an error log is produced, which then requires that the system be disassembled and redone, which can be tedious, time consuming and prone to error.

BRIEF DESCRIPTION OF THE DRAWINGS

Example implementations are illustrated in referenced figures of the drawings. It is intended that the implementations and figures disclosed herein are to be considered illustrative rather than limiting.

DETAILED DESCRIPTION

Aspects of the present disclosure involve systems, methods, devices and the like, for verifying and validating accurate memory module placement. In one embodiment, a printed board is configured to include indicators and actuating elements that can be used to indicate correct memory module location placement within the printed board. The actuating elements can be in the form of buttons that may be depressed and configured to trigger indicators such as, light emitting diodes (LED) that correlate to slots to where a memory module should be connected on the PCB. A lit LED may indicate a slot where a memory module is placed. Different LEDs or combination of LEDs may indicate different memory configurations. In another embodiment, the actuating elements can be used to verify accurate memory module placement. Once memory modules are in place, depression of the actuating element again can be used to ensure that the memory modules are located at each of the slots corresponding to the lit LEDs.

Figure 1:
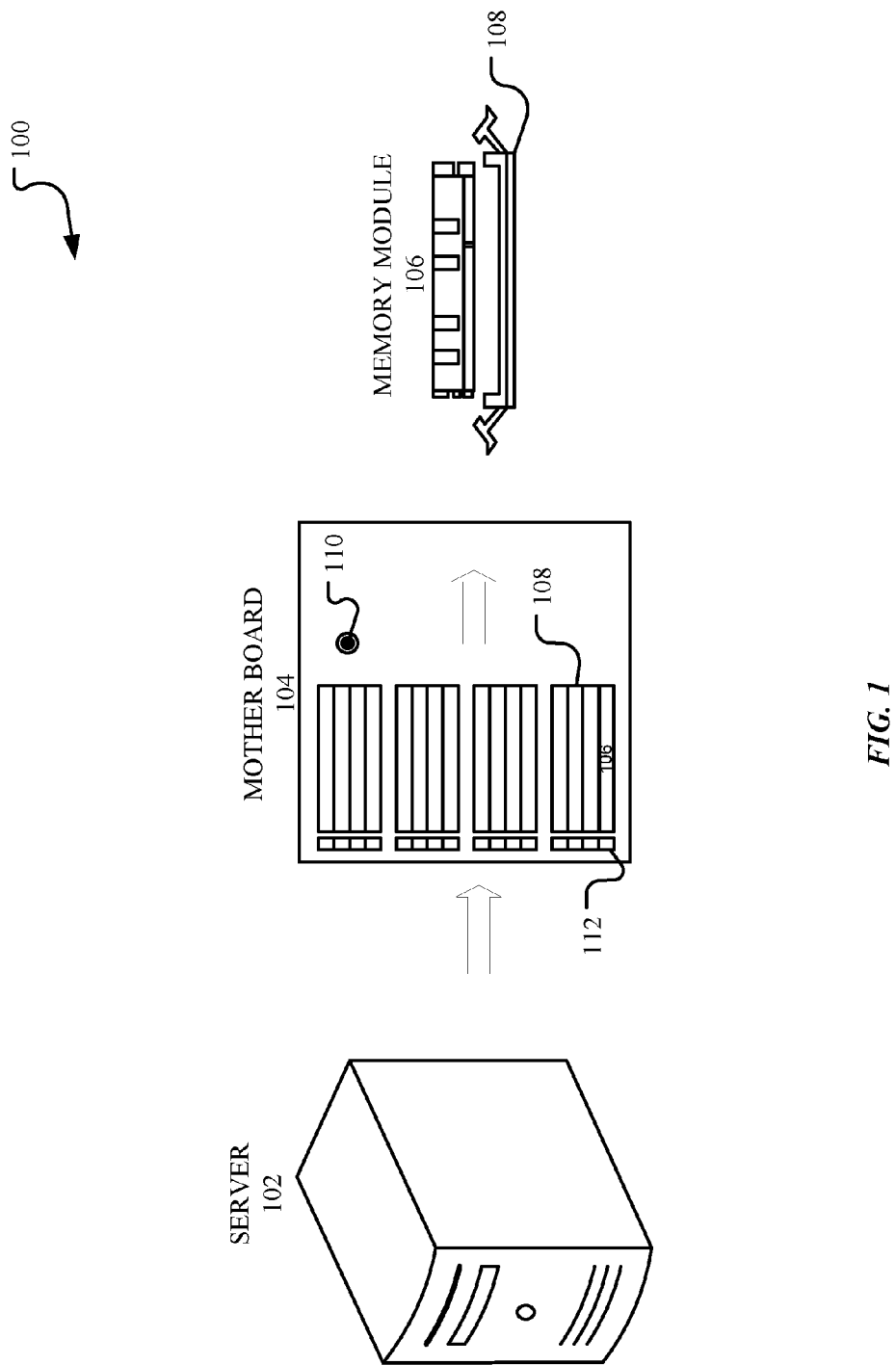
FIG. 1 is a diagram illustrating a general computing system with variable memory module configuration.

FIG. 1 illustrates a computing system 100 with corresponding components that enable variable memory configurations. Oftentimes, a platform, such as a server 102, may be configured to manage computing resources, run programs, and/or manage, interconnect, or run other devices. A motherboard 104 is a fundamental component of a server 102 and numerous other forms of computing devices. The motherboard 104 includes a printed circuit board that enables device functionality and is used to connect various internal components within the server 102. The motherboard 104, which can often be found mounted in the server 102, can handle heavy workloads, function at fast speeds, and store large amounts of data.

To store varying amounts of data, motherboards 104 may be configured with more or less memory modules 106 based on the functions intended for the server 102, and cost, among other things. In one possible configuration, a motherboard 104 may be in a "full configuration" where all memory slots 108 are occupied by a memory module 106. A memory slot 108 allows computer memory (e.g., dual in-line memory module DIMM) to be added to a motherboard 104. In other possible configurations, the motherboard 104 can function on a lower memory configuration (e.g., minimum or medium configuration) where less than all or a set of the slots 108 are used.

Conventionally, motherboards 104 have been designed to include memory slots 108 that are aligned with corresponding LEDs 112 that light when a faulty memory module (e.g., a (DIMM) 106) is located in the memory slot 108. The fault can be identified by depressing a fault remind button 110 to check for and report faults. Generally, a device driver monitors the operational status of the mother board. A change in the status can cause an error report to execute including the existence of a faulty memory module. A fault response processor is operable to consequent upon receipt of the error report by estimating the location of the faulty memory module and applying the fault indication that identifies the location corresponding to the faulty memory module 106. Therefore, a depression of the fault remind button 110 illuminates the corresponding LED 112, which enables the identification and replacement of the faulty memory module.

Figure 2:
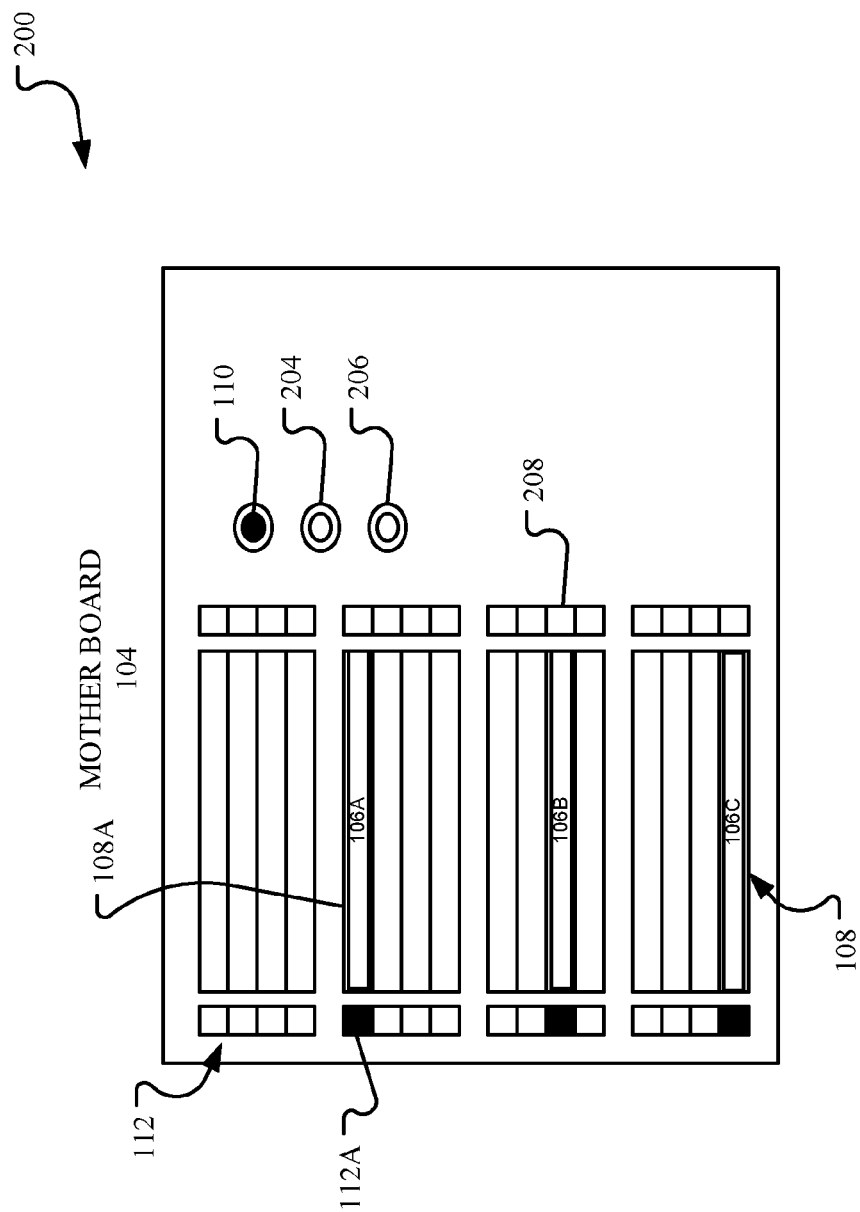
FIG. 2 is a diagram illustrating an exemplary printed board with a fault system actuating element in use.

Conventional motherboards 104, however, fail to provide an indication when a memory module is incorrectly placed in a slot 108 or missing all together. FIG. 2 illustrates an exemplary motherboard 104 with three actuating elements 110, 204, and 206 designed to provide information on faults and incorrectly placed memory modules in slots 108 of the motherboard 104. The first actuating element is the fault remind button 110 which, as described, causes the illumination of an LED adjacent to a bad memory module. The next two actuating elements are configuration buttons 204 and 206 that can be used to identify the slots that are to be populated according to a specific memory configuration (e.g., minimum or medium configuration). Indication elements can be located proximate the memory slots 108 such that activation of the indication element causes the illumination of the indication element corresponding to the memory slot 108 where a memory module 106 can be placed. For example, configuration LEDs 208 are located adjacent to the slots 108 and can be directly connected to the configuration buttons 204 and 206, such that a depression of the configuration button 204 or 206 will cause the corresponding configuration LEDs 208 to illuminate. Alternatively, the depression of the configuration button 204 or 206 can cause the corresponding configuration LEDs 208 to illuminate based on a report generated by a device driver.

In FIG. 2 an exemplary system 200 where motherboard 104 illustrates the activation of the fault remind button 110 and the indication that faulty memory modules (e.g., DIMMs) 106 exist. The fault remind button 110 can be configured to engage fault light emitting diodes 112 that represent each of the memory slots 108 located within the motherboard 104. When the fault remind button 110 is depressed, an LED 112A can indicate that the adjacent slot 108A contains a faulty memory module 106A and that needs replacement.

As indicated, servers 102 can be configured with varying memory configurations based on system needs. For example, three configurations commonly used include: full, medium, and minimum configurations. A full configuration can include a configuration where the motherboard 104 is fully stocked and all slots 108 available have a memory module 106. Medium and minimum configurations are those configurations with fewer memory modules 106 installed relative to the available slots. Therefore, empty slots 108 will exist between those filled with memory modules 106, creating an opportunity for error. However, only correct slots must be populated for any configuration less than a full configuration. Thus, in medium and minimum configurations, a missing or misplaced memory module 106 could not be so easily identified relative to a full configuration where a quick visual inspection may identify an open slot 108. Note that although full, minimum, and medium configurations are discussed herein, other configurations are possible and the described configurations are provided as examples only.

Figure 3A:
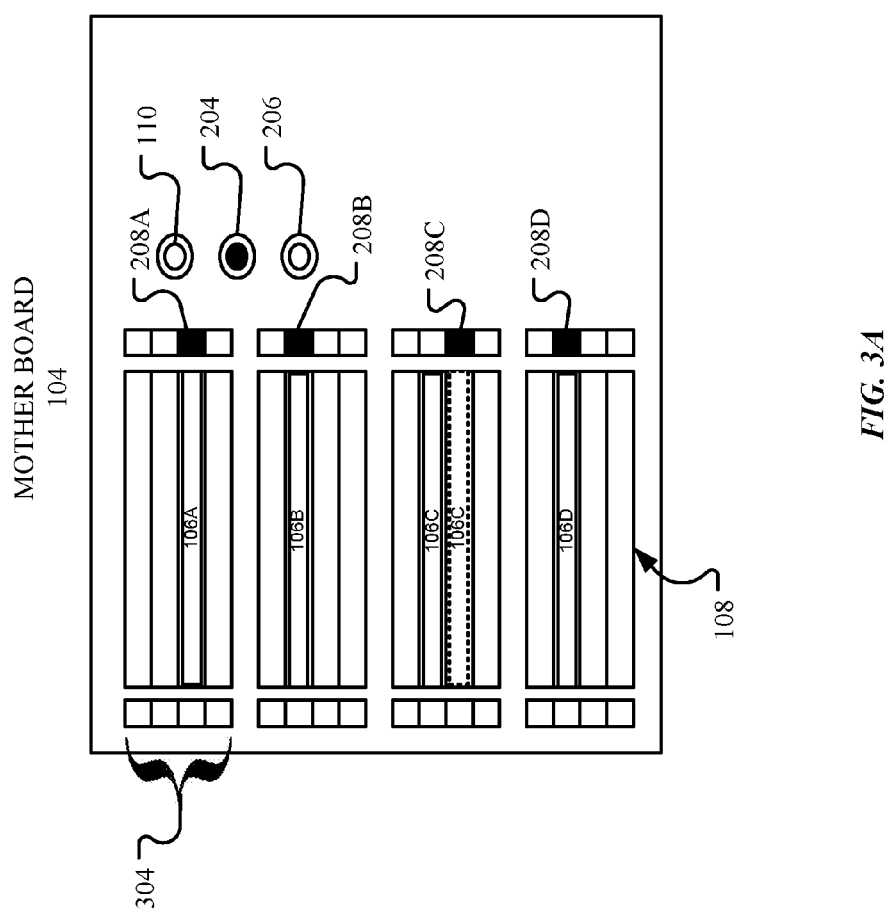
FIG. 3A is a diagram illustrating an exemplary printed board with a minimum configuration actuating element in use.
Figure 3B:
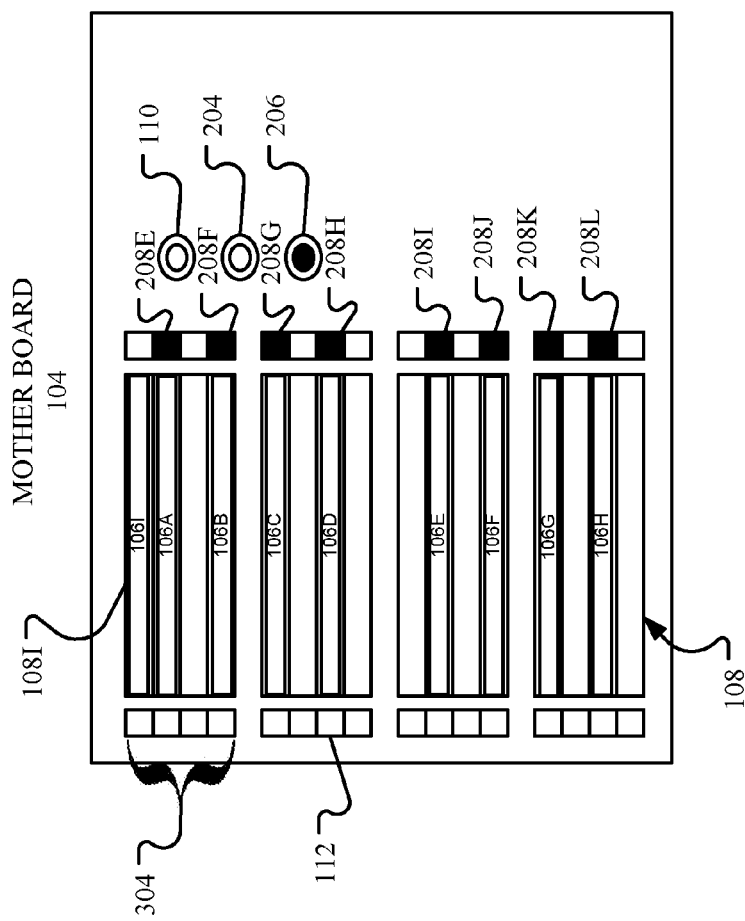
FIG. 3B is a diagram illustrating an exemplary printed board with a medium configuration actuating element in use.

To aid in the correct placement of the memory modules 106, configuration actuating elements 204 and 206 can be depressed and used to locate the correct slots 108 in which the memory modules 106 belong using adjoining configuration LEDs 208. FIGS. 3A and 3B illustrate exemplary implementations of the use the configuration actuating elements 204, 206.

FIG. 3A is a diagram illustrating an exemplary motherboard 104 with the minimum configuration actuating element 204 in use. In one embodiment, a minimum configuration includes having a single memory module 106 in each bank 304 (a bank is a set of four slots 108). In this configuration, the location of the memory module 106 cannot easily be determined as the location of the memory module 106 is not the same in each bank 304, empty slots may exist before or after the slot that is to be populated, there is tight spacing between slots 108 and the system, and the system is otherwise visually complex.

In FIG. 3A, the memory module 106 (e.g., DIMM) is located in the corresponding slot 108 adjacent to the lit configuration LEDs 208. The proper combination of configuration LEDs 208 may illuminate when a respective button (e.g., configuration actuating element 204) is depressed. In one instance, the configuration LEDs 208 may be directly hardwired to the configuration actuating element 204, such that a depression of the minimum configuration actuating element 204 illuminates the corresponding configuration LEDs 208. For example, a first memory slot 108 may be configured to receive a first memory module 106 corresponding to the minimum configuration. Therefore, depression of the actuating element 204 can cause an adjacent configuration LEDs 208 to illuminate in association with the first memory configuration.

In another instance, a device driver can provide an indication (via a report generated by the device driver) to a processor of the corresponding slot locations for the minimum configuration selected. The processor provides an indication of the correct slot locations corresponding to the minimum configuration such that depression of the minimum configuration actuating element 204 causes the configuration LEDs 208 to light. For example, minimum configuration actuating element 204 can be pushed, and configuration LEDs 208A-208D illuminate, where configuration LEDs 208A-208D corresponds to the correct slots for memory module 106A-106D placement for minimum configuration. As shown, memory module 106C is not in the correct slot and should be moved to the adjacent slot as shown in the dashed here. Note that the number and location of the lit configuration LEDs 208 can vary and the current configuration is used for exemplary purposes only.

In some instances, it is beneficial to ensure that once the memory modules 106 have been placed in the corresponding slots that verification occurs to ensure modules were not missed. In this instance, the minimum configuration actuating element 204 can be depressed again as verification that the memory modules 106 are adequately placed in the corresponding slots. Verification can occur by visually ensuring the memory modules 106 are installed in the slots 108 with the illuminated configuration LEDs 208. Therefore, the minimum verification actuating element 204 can have the dual functionality, for indication and verification.

FIG. 3B is a diagram illustrating an exemplary motherboard 104 with the medium configuration actuating element 206 in use. In one embodiment, the medium configuration includes having multiple memory modules 106 in a bank 304 (e.g., slot 208E and 208F). In this configuration, the location of the memory module 106 cannot easily be determined as the location of the memory modules 106 is not the same in each bank 304 and only a set of the slots 108 are used.

In FIG. 3B, the medium configuration actuating element 206 has been enabled and the memory module 106 is located in the corresponding slot 108 adjacent to the lit configuration LEDs 208. The proper combination of configuration LEDs 208, may illuminate when the respective medium configuration actuating element 206 is depressed. In one instance, the configuration LEDs 208 may be directly hardwired to the medium configuration actuating element 206, such that a depression of the medium configuration actuating element 206 illuminates the corresponding configuration LEDs 208. For example, a two memory slots 108 may be configured to each receive a memory module 106 corresponding to the medium configuration. Therefore, depression of the actuating element 206 can cause an adjacent configuration LEDs 208 to illuminate in association with the medium configuration.

In another instance, a device driver can provide an indication to the processor the slots locations corresponding to the medium configuration. The processor can then process the locations such that depression of the minimum configuration actuating element 204 caused the configuration LEDs 208 to light. In the example shown in FIG. 3B, the medium configuration actuating element 206 is depressed and the configuration LEDs 208E-208L illuminate, where configuration LEDs 208E-208L correspond to the correct slots for memory modules 106A-106H in the medium configuration. As shown, memory module 106I was incorrectly placed in memory module 108I and should be removed. Alternatively, memory module 106I may have been incorrectly placed in an adjacent slot 108 requiring the move of the memory module 106I to the correct slot 108 location. Note, as mentioned, the number and location of the lit configuration LEDs 208 can vary and the current configuration is used for exemplary purposes only.

Further, like with minimum configuration, the medium configuration actuating element 206 can also be used for verification purposes. That is to say, once memory modules 106 are in place, the medium configuration actuating element 206 can be depressed once more to visually verify that the memory modules 106 are installed in the slots with the illuminated configuration LEDs 208.

Note that configuration LEDs 208, can operate under a storage capacity which is able to hold charge after the server 102 is down and the motherboard 104 is out of the server 102 and being tested, reconfigured, or maintained. That is to say, slot placement location can be determined from the configuration LEDs 208 after powering down the server 102 using a backup source that can be used to power the configuration LEDs 208. The backup source can come in the form of a battery, a super capacitor, or other storage unit.

In some instances, the slots 108 may also be lit to further enhance the correct location where memory modules should reside. For example, a small pin hole can be added to the side wall of the slot 108 adjacent to the LED so that the slot 108 itself is illuminated. As another example, acrylic tabs can light up to ensure correct slot 108 is used. Still as another example, the slots 108, configuration LEDs 208, and/or configuration actuating elements 204 and 206 may be color coordinated to correspond to the different configurations.

Figure 4A:
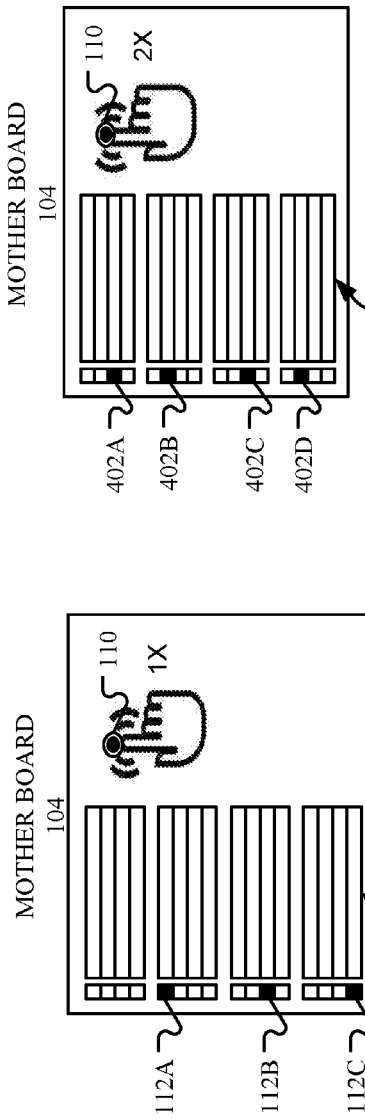
FIG. 4A is a diagram illustrating the use of the fault system actuating element to illustrate the presence of faulty memory modules.
Figure 4B:
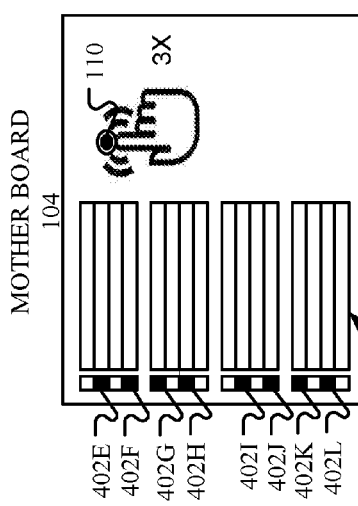
FIG. 4B is a diagram illustrating the use of the fault system actuating element to illustrate the slot locations for memory modules in a minimum memory configuration.
Figure 4C:
FIG. 4C is a diagram illustrating the use of the fault system actuating element to illustrate the slot locations for memory modules in a medium memory configuration.

In some instances, software routines instead of hardware components (e.g., configuration actuating elements 204, 206 and configuration LEDs 208) may be added to aid in locating the correct slots 108 relative to the desired configuration. FIGS. 4A-4C provide an exemplary use of the fault remind button 110 for identifying faults and locating memory module location placement for varying configurations. Specifically, FIGS. 4B-4C provide alternative uses to the fault remind button 110 that also enable memory module 106 location identification and verification. For example, a routine may be called such that a multifunction report is generated and used to determine the corresponding LEDs to illuminate based on the functionality desired (e.g., identify faulty memory modules 106, identify slot 108 locations to populate in a minimum configuration, or identify slot 108 locations to populate in a medium configuration). Alternatively, a routine may be run such that the fault remind button 110 continues to operate as described and is additionally wired to identify slots 108 for populating with memory modules 106 based on the desired configuration. Note that in some instances, the routine may run such that the fault remind button 110 continues to operate as described and identifies slots 108 (using software) for populating with memory modules 106 based on the desired configuration using.

In one instance, the fault remind button 110 may be depressed one or more times based on the desired functionality. For example, the fault remind button 110 may be depressed one time for identifying faulty memory modules 106, two times for identifying slot locations to populate in a minimum memory configuration, and three times for identifying slots locations to populate in a medium memory configuration and in some instances four times to clear all configurations.

FIGS. 4A-4C, are diagrams illustrating the various uses of the fault remind button 110. In FIG. 4A, the standard use of the fault remind button 110, as described above and in conjunction with FIG. 2 is illustrated. In this embodiment, depression of the fault remind button 110 one time, triggers indication by the illumination of fault LEDs 112A-112C, that faulty memory modules 106 exist.

FIG. 4B is a diagram illustrating the use of the fault remind button 110 to illustrate the slot 108 locations for placement of memory modules 106 in a minimum memory configuration. In one embodiment, the fault remind button 110 is enabled to trigger a routine such that a depression of the fault remind button 110 two times is used to indicate the slot locations where memory modules 106 may be placed when using a minimum memory configuration. In this embodiment, the fault remind button 110 may be configured to recognize two depressions as corresponding to a minimum memory configuration. In this embodiment, the LEDs illuminate according to the minimum memory configuration. For example, in FIG. 4B LEDs 402A-402D are illuminated to represent minimum configuration. Again, in a minimum configuration, unoccupied slots 108 may exist before and/or after the slots 108 that are filled by the memory modules 106.

FIG. 4C is a diagram illustrating the use of the fault system button 110 to illustrate the slot 108 locations for placement of memory modules 106 in a medium memory configuration. In one embodiment, the fault remind button 110 is depressed three times to indicate the slot 108 locations where memory modules can be placed when using a minimum configuration. In this embodiment, the fault remind button 110 may be configured to call a routine that may recognize three depressions as corresponding to a medium memory configuration and thus illuminates the appropriate LEDs. For example, in FIG. 4C LEDs 402E-402L are illuminated to correspond to a medium configuration. Again, in medium configuration, slots 108 may be unoccupied before and/or after each of the slots 108 that are filled by the memory modules 106.

Figure 5:
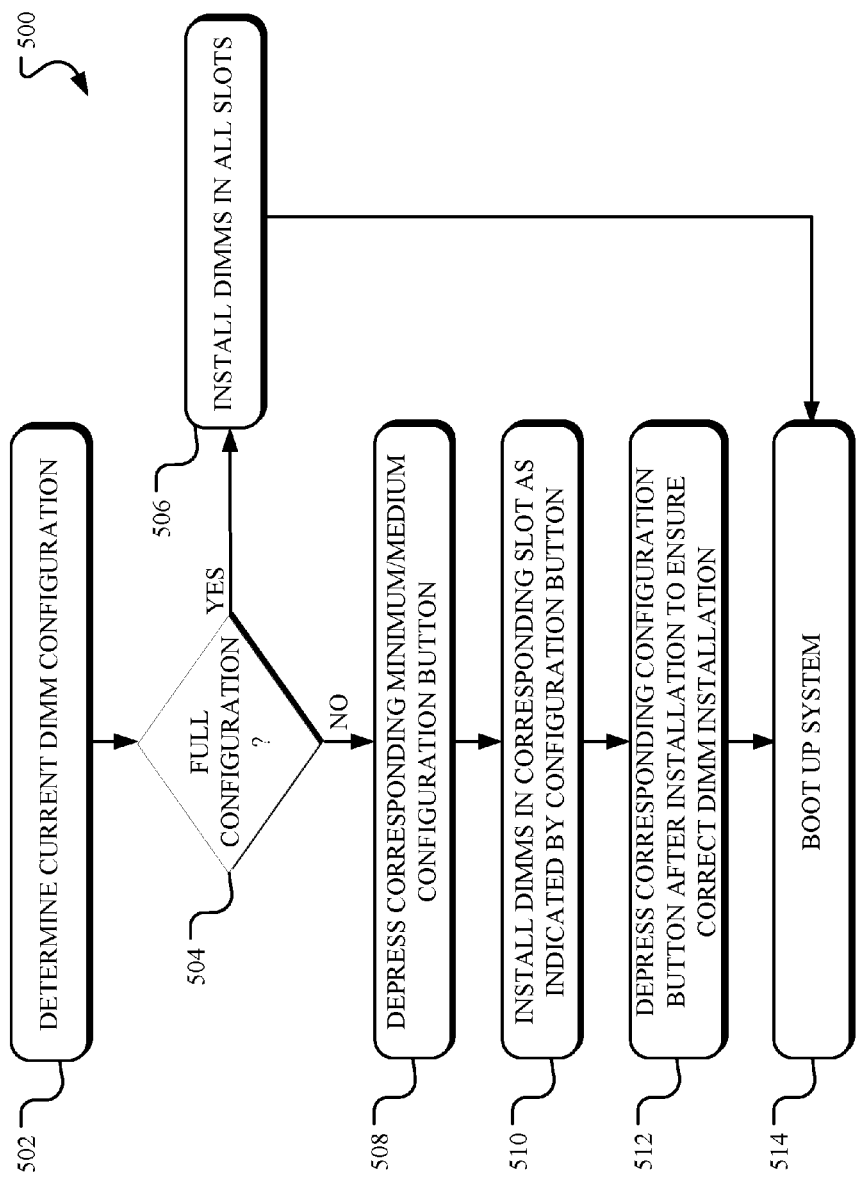
FIG. 5 is a flowchart of the various operations of the presently disclosed technology.

FIG. 5 is a flowchart of the various operations of the presently disclosed technology. Specifically, FIG. 5 is a flowchart of a method 500 for determining the correct location of memory modules 106 for various memory configurations in a motherboard 104. Method 500 begins with operation 502, where the current memory module 106 (e.g., DIMM) configuration is determined. As previously indicated, there exist three memory configurations possible for populating a motherboard 104 based on system requirements and functions intended for the server 102. In general, the memory configurations can include full, medium, and minimum configuration, however other configurations are possible.

Once the memory configuration is determined, method 500 continues to operation 504 where a decision is made as to whether the configuration determined is a full configuration. A full configuration is a configuration where all the slots in the motherboard 104 are fully populated. That is to say, a memory module 106 resides in every slot 108 of the current motherboard 104. If the decision is that indeed full configuration is desired, then method 500 continues to operation 506. In operation 506, a memory module 106 is installed in each and every slot of the motherboard 104. In this configuration, validation and/or verification of memory module location is not necessary as the motherboard 104 is fully populated (e.g., full DIMM banks).

However, if the current memory configuration is not a full configuration, then method 500 continues to operation 508 where the corresponding configuration button/actuating element is depressed. That is to say the minimum or medium configuration button is depressed corresponding to the current memory configuration desired. In a minimum memory configuration, the minimum configuration actuating element 204 is depressed and in the medium memory configuration, the medium configuration actuating element 206 is depressed. Depression of the actuating element 204, 206 illuminates configuration LEDs 208 corresponding to the appropriate slot 108 location where a memory module 106 can reside based on the selected configuration. In some instances, the configuration LEDs 208 and the configuration actuating elements 204, 206 can be directly wired such that depression of the configuration actuating element 204 or 206 illuminates the corresponding configuration LEDs 208. In other instances, depression of the configuration actuating elements 204, 206 can trigger the identification of the slots by a report generated by a device driver. Still in other instances, the fault remind button 110 may be functionally enabled to identify the slots 108 that may be filled by the memory modules 106 based on a routine that correlates the number of depression on the fault remind button 110 to a function.

In operation 508, the memory modules 106 (e.g., DIMMs) are installed in the corresponding slots 108 illuminated by the adjacent LEDs. Again, minimum configuration may require less memory than the medium configuration. Thus, in the medium configuration more memory modules may populate the motherboard 104.

In operation 512, once the memory modules 106 have been installed, the corresponding configuration actuating element 206, 208 can be depressed again as a verification that the memory modules where correctly installed. Operation 512 serves as a verification step in method 500, by highlighting the slots once again to ensure that the memory modules 106 are correctly placed. In this operation, the corresponding LEDs and/or slots may be highlighted. Once the memory modules are correctly placed for the corresponding configuration (e.g., full, medium, or minimum), the system is booted up in operation 514.

Figure 6:
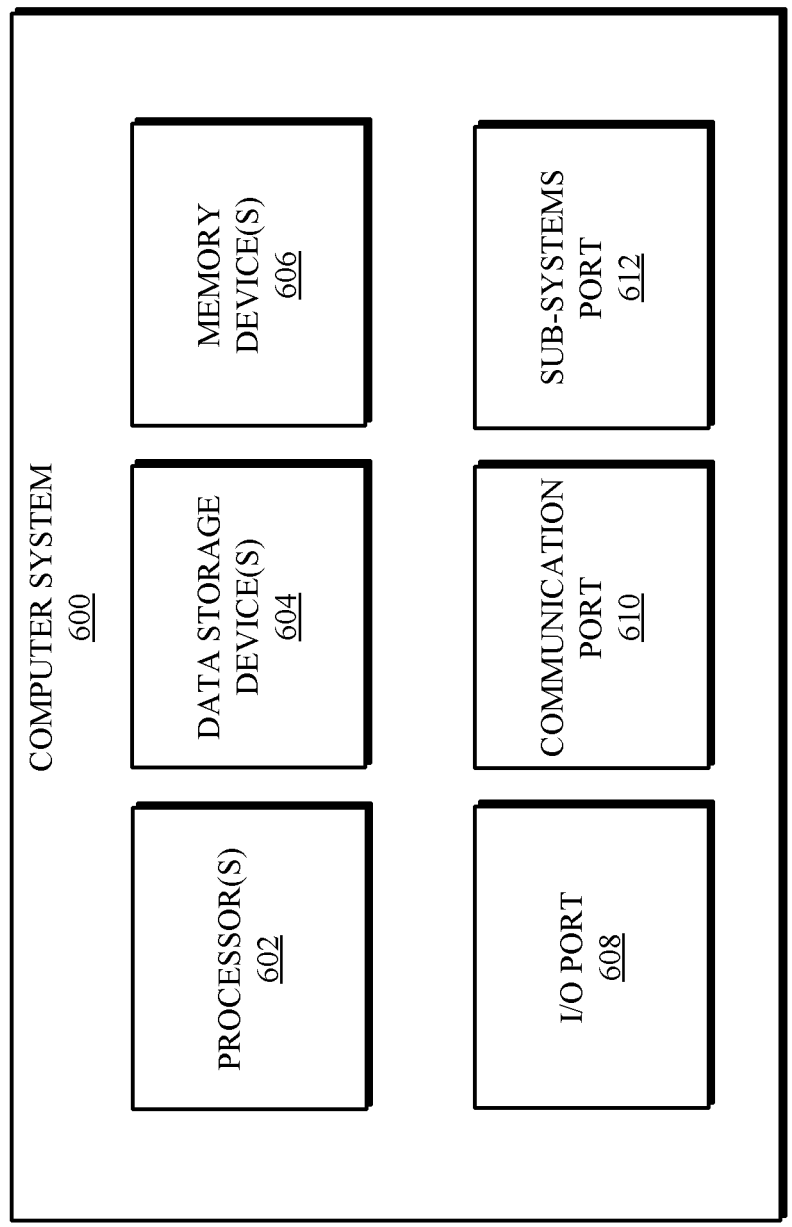
FIG. 6 is an example computing system that may be used in implementing embodiments of the present disclosure.

Referring to FIG. 6, a detailed description of an example computing system 600 having one or more computing units that may implement various systems and methods discussed herein is provided. The computing system 600 may be applicable to the server system 102 and other computing or network devices. It will be appreciated that specific implementations of these devices may be of differing possible specific computing architectures not all of which are specifically discussed herein but will be understood by those of ordinary skill in the art.

The computer system 600 may be a computing system is capable of executing a computer program product to execute a computer process. Data and program files may be input to the computer system 600, which reads the files and executes the programs therein. Some of the elements of the computer system 600 are shown in FIG. 6, including one or more hardware processors 602, one or more data storage devices 604, one or more memory devices 606, and/or one or more ports 608-612. Additionally, other elements that will be recognized by those skilled in the art may be included in the computing system 600 but are not explicitly depicted in FIG. 6 or discussed further herein. Various elements of the computer system 600 may communicate with one another by way of one or more communication buses, point-to-point communication paths, or other communication means not explicitly depicted in FIG. 6. The communication buses can include a host bus that connects processor 602 and memory devices 606 for determining the operational status of the computer system 600 (e.g., server 102).

The processor 602 may include, for example, a central processing unit (CPU), a microprocessor, a microcontroller, a digital signal processor (DSP), and/or one or more internal levels of cache. There may be one or more processors 602, such that the processor 602 comprises a single central-processing unit, or a plurality of processing units capable of executing instructions and performing operations in parallel with each other, commonly referred to as a parallel processing environment. Further, the processor 602 can be used to run software that enables the identification of the slots that correspond to the memory configuration. The location of slots and/or incorrectly placed memory modules may be identified from reports that can be generated by device drivers within the software running on the processor 602.

The computer system 600 may be a conventional computer, a distributed computer, server, or any other type of computer, such as one or more external computers made available via a cloud computing architecture. The presently described technology is optionally implemented in software stored on the data storage device(s) 604, stored on the memory device(s) 606, and/or communicated via one or more of the ports 608-612, thereby transforming the computer system 600 in FIG. 6 to a special purpose machine for implementing the operations described herein. Examples of the computer system 600 include personal computers, terminals, servers, workstations, mobile phones, tablets, laptops, personal computers, multimedia consoles, gaming consoles, set top boxes, and the like.

The one or more data storage devices 604 may include any non-volatile data storage device capable of storing data generated or employed within the computing system 600, such as computer executable instructions for performing a computer process, which may include instructions of both application programs and an operating system (OS) that manages the various components of the computing system 600. The data storage devices 604 may include, without limitation, magnetic disk drives, optical disk drives, solid state drives (SSDs), flash drives, and the like. The data storage devices 604 may include removable data storage media, non-removable data storage media, and/or external storage devices made available via wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 606 may include volatile memory (e.g., dynamic random access memory (DRAM), static random access memory (SRAM), etc.), dual in-line memory modules (DIMMs), and/or non-volatile memory (e.g., read-only memory (ROM), flash memory, etc.).

Computer program products containing mechanisms to effectuate the systems and methods in accordance with the presently described technology may reside in the data storage devices 604 and/or the memory devices 606, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 600 includes one or more ports, such as an input/output (I/O) port 608, a communication port 610, and a sub-systems port 612, for communicating with other computing, or network devices. It will be appreciated that the ports 608-612 may be combined or separate and that more or fewer ports may be included in the computer system 600.

The I/O port 608 may be connected to an I/O device, or other device, by which information is input to or output from the computing system 600. Such I/O devices may include, without limitation, one or more input devices, output devices, and/or environment transducer devices. In one implementation, the input devices convert a human-generated signal, such as, human voice, physical movement, physical touch or pressure, and/or the like, into electrical signals as input data into the computing system 600 via the I/O port 608. Similarly, the output devices may convert electrical signals received from computing system 600 via the I/O port 608 into signals that may be sensed as output by a human, such as sound, light, and/or touch. The input device may be an alphanumeric input device, including alphanumeric and other keys for communicating information and/or command selections to the processor 602 via the I/O port 608. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, a LED, and/or the like.

In one implementation, a communication port 610 is connected to a network by way of which the computer system 600 may receive network data useful in executing the methods and systems set out herein as well as transmitting information and network configuration changes determined thereby. Stated differently, the communication port 610 connects the computer system 600 to one or more communication interface devices configured to transmit and/or receive information between the computing system 600 and other devices by way of one or more wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. One or more such communication interface devices may be utilized via the communication port 610 to communicate one or more other machines, either directly over a point-to-point communication path, over a wide area network (WAN) (e.g., the Internet), over a local area network (LAN), over a cellular (e.g., third generation (3G) or fourth generation (4G)) network, or over another communication means. Further, the communication port 610 may communicate with an antenna for electromagnetic signal transmission and/or reception. In some examples, an antenna may be employed to receive Global Positioning System (GPS) data to facilitate determination of a location of a machine, vehicle, or another device.

The computer system 600 may include a sub-systems port 612 for communicating with one or more systems and/or exchange information between the computer system 600 and one or more sub-systems.

The computer system 600 set forth in FIG. 6 is but one possible example of a computer system that may employ or be configured in accordance with aspects of the present disclosure. It will be appreciated that other non-transitory tangible computer-readable storage media storing computer-executable instructions for implementing the presently disclosed technology on the computing system 600 may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); random access memory (RAM); erasable programmable memory (e.g., EPROM and EEPROM); flash memory; or other types of medium suitable for storing electronic instructions.

While the present disclosure has been described with reference to various implementations, it will be understood that these implementations are illustrative and that the scope of the present disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. An apparatus comprising:
    a first memory slot supported on a printed circuit board, the first memory slot configured to receive a first memory module;
    a second memory slot supported on the printed circuit board, the second memory slot configured to receive a second memory module;
    a third memory slot supported on the printed circuit board, the third memory slot configured to receive a third memory module;
    a first indicating element supported on the printed circuit board proximate the first memory slot;

a second indicating element supported on the printed circuit board proximate the second memory slot;

a third indicating element supported on the printed circuit board proximate the third memory slot; and at least one actuating element in electrical communication with the first indicating element, the second indicating element, and the third indicating element, actuation of the at least one actuating element causing activation of the first indicating element in association with a first memory configuration where the first memory module is in the first memory slot or causing the activation of the second indicating element and the third indicating element in association with a second memory configuration providing more computer memory than the first memory configuration, and where the second memory module is in the second memory slot and the third memory module is in the third memory slot.

2. The apparatus of claim 1, wherein the at least one actuating element is hardwired to the first indicating element, the second indicating element, and the third indicating element.

3. The apparatus of claim 1, wherein the actuation of the at least one actuating element causes the activation of the first indicating element based on a report generated by a device driver.

4. The apparatus of claim 1, wherein the actuation of the at least one actuating element causes that activation of the first indicating element, the second indicating element, and the third indicating element in association with the second memory configuration.

5. The apparatus of claim 1, wherein the first memory configuration is a minimum memory configuration.

6. The apparatus of claim 1, wherein the second memory configuration is a medium memory configuration.

7. The apparatus of claim 1, wherein an activated indicating element causes illumination of the corresponding proximate memory slot.

8. The apparatus of claim 1, wherein a first actuation of a first actuating element corresponds to the activation of the first indication element associated with the first memory configuration and wherein a first actuation of a second actuating element corresponds to the activation of the second indicating element and the third indicating element in association with the second memory configuration.

9. The apparatus of claim 1, wherein a first actuation of the at least one actuating element corresponds to the activation of the first indication element associated with the first memory configuration and a second actuation of the at least one actuating element corresponds to the activation of the second indicating element and the third indicating element in association with the second memory configuration.

10. An apparatus comprising:
a plurality of memory slots coupled to a printed circuit board, the plurality of memory slots configured to receive a first plurality of memory modules associated with a first memory configuration and configured to receive a second plurality of memory modules associated with a second memory configuration;

a plurality of indicating elements, each indicating element of the plurality of indicating elements positioned adjacent to one of the plurality of memory slots; and a first actuating element electrically connected to the plurality of indicating elements, a depression of the first actuating element illuminating a first set of the plurality of indicating elements corresponding to the first memory configuration and visually indicating into which of the plurality of memory slots the memory modules are placed to achieve the first memory configuration or illuminating a second set of the plurality of indicating elements different from the first set of the plurality of indicating elements, the second set of the plurality of indicating elements corresponding to the second memory configuration and visually indicating into which of the plurality of memory slots the memory modules are placed to achieved the second memory configuration.

11. The apparatus of claim 10, wherein a first depression of the first actuating element illuminates the first set of the plurality of indicating elements corresponding to the first memory configuration.

12. The apparatus of claim 10, wherein a second depression of the first actuating element illuminates the second set of the plurality of indicating elements corresponding to the second memory configuration.

13. The apparatus of claim 10, wherein a first depression of a second actuating element illuminates the second set of the plurality of indicating elements corresponding to the second memory configuration.

14. The apparatus of claim 10, wherein the first memory configuration is a minimum memory configuration.

15. The apparatus of claim 10, wherein the second memory configuration is a medium memory configuration.

16. The apparatus of claim 10, wherein the first actuating element is hardwired to the plurality of indicating elements.

17. The apparatus of claim 10, wherein the first set of the plurality of indicating elements includes a portion of the plurality of indicating elements.

18. The apparatus of claim 12, wherein the first and the second depressions of the first actuating element are functions of a routine that locates the corresponding first set and second set of the plurality of indicating elements to illuminate.

19. A method for determining memory slot locations for memory module placement comprising:
receiving a first input at a first actuating element electrically connected to a plurality of indicating elements; and illuminating a first set of the plurality of indicating elements corresponding to a first memory configuration in response to the first input received at the first actuating element, wherein the illuminated first set of plurality of indicating elements visually indicate into which of a plurality of memory slots memory modules are placed to achieve the first memory configuration or illuminating a second set of the plurality of indicating elements different from the first set of the plurality of indicating elements, the second set of the plurality of indicating elements corresponding to a second memory configuration and visually indicating into which of the plurality of memory slots the memory modules are placed to achieve the second memory configuration.

20. The method of claim 19, wherein the first actuating element is hardwired to the plurality of indicating elements.

* * * * *

UNITED STATES PATENT AND TRADEMARK OFFICE
CERTIFICATE OF CORRECTION

PATENT NO. : 9,940,235 B2
APPLICATION NO. : 15/197471
DATED : April 10, 2018
INVENTOR(S) : Bucaro Page 1 of 1

It is certified that error appears in the above-identified patent and that said Letters Patent is hereby corrected as shown below:

In the Specification

In Column 5, Line 3, delete "1081" and insert -- 108I --, therefor.

Signed and Sealed this
Fourth Day of September, 2018

Andrei Iancu
*Director of the United States Patent and Trademark Office*